United States Patent [19]

Robinson et al.

[11] Patent Number: 5,690,319
[45] Date of Patent: Nov. 25, 1997

[54] PNEUMATIC SUSPENSION SYSTEM

[75] Inventors: Frank Robinson, Centerville; James William Zehnder, II, Huber Heights; William Charles Kruckemeyer, Beaver Creek; Herbert Stanley Summers, III, Trotwood; Jay Michael Shores, Miamisburg; Stephen Carey Hagwood, Dayton, all of Ohio

[73] Assignee: General Motors Corporation, Detroit, Mich.

[21] Appl. No.: 632,249

[22] Filed: Apr. 15, 1996

[51] Int. Cl.⁶ .................................................. F16F 9/04
[52] U.S. Cl. ........................... 267/64.19; 267/64.28
[58] Field of Search ........................... 267/218, 220, 267/35, 64.16, 64.19, 64.21, 64.23, 64.24, 64.25, 64.26, 64.27, 64.28; 280/708, 711, 714

[56] References Cited

U.S. PATENT DOCUMENTS

| | | | |
|---|---|---|---|
| 4,067,558 | 1/1978 | Keijzer et al. | 267/34 |
| 4,655,438 | 4/1987 | Cameron | 267/64.21 X |
| 4,673,171 | 6/1987 | Buma | 267/8 R |
| 4,690,430 | 9/1987 | Buma | 280/708 |
| 4,961,594 | 10/1990 | Pees | 280/693 |
| 5,009,401 | 4/1991 | Weitzenhof | 267/64.21 |
| 5,180,144 | 1/1993 | Hellyer et al. | 267/64.19 |

*Primary Examiner*—Josie Ballato
*Attorney, Agent, or Firm*—Jeffrey A. Sedlar

[57] ABSTRACT

A turnable pneumatic suspension system is provided wherein proper air flow to the diaphragm is ensured through a charging route that is maintained in a securely sealed condition and which includes a nonrotatable point of attachment to a remote pressurization device. The pneumatic suspension system includes an air spring and a damper in combination, mounted to rotate relative to a vehicle with a dynamic seal provided between a nonrotatable seal ring and mating components of the air spring facilitating rotation of the suspension module while the entrance to the air charging route of the suspension module remains stationary.

15 Claims, 2 Drawing Sheets

5,690,319

PNEUMATIC SUSPENSION SYSTEM

BACKGROUND OF THE INVENTION

The present invention relates to a pneumatic suspension system for vehicles and more particularly, to a pneumatic suspension system with a turnable damper and spring module assembly.

It is conventionally known to provide a vehicle suspension system that includes a compliant element, in particular a spring, in combination with a damping element such as a strut or a shock in modular form. The compliant element and the damping element extend between the vehicle's body and wheels. The spring as the compliant element can be of a coil-type steel construction or a pneumatic-type construction.

A pneumatic-type spring for use in a suspension module is generally a column of gas that is confined within a rubber and metal container. Spring action results from compression and expansion of the confined gas. This type of pneumatic spring supports the weight of the vehicle and utilizes the elasticity of the confined gas as an energy medium. A commonly used gas in pneumatic springs is air.

Pneumatic suspension modules conventionally used on vehicles are known to utilize a rolling lobe air spring in combination with a modified strut-type damper. This type of device uses the damper as a piston. One end of the air spring's flexible member is clamped to a metal support and the other end includes a reversible section with an inner bead that is clamped at the upper end of the strut's reservoir tube. A load increase causes the flexible member to rollover the reservoir tube.

This type of pneumatic suspension provides a means to compensate for changes in loading of the vehicle and provides a means for automatically leveling the vehicle by varying the amount of gas confined in the air spring arrangement. Compensation is achieved by increasing or decreasing the pressure inside the air spring. Therefore, a remote pressurization source is typically provided. The remote pressurization source is connected to an air fitting of the pneumatic suspension module by an air line.

A challenge is involved in providing a pneumatic suspension system that includes an air spring in combination with a damper. A problem that must be overcome is to determine the optimum packaging configuration of the air spring. The packaging must be such that it does not unduly subtract from the active travel length of the damper, while concurrently, adequate support must be provided in mounting the suspension system. This problem is complicated when the packaging must be such that a turnable suspension module is provided. When the module rotates relative to its upper mounting surface on the vehicle, conventionally known air fittings rotates as well. A rotatable air fitting requires increased packaging space.

A turnable suspension module that selectively communicates with a remote volume must also have a sufficiently large communication channel to ensure proper air flow between the remote pressurization source and the air spring. This is so that the actual intended spring rate of the air spring is not effected by an inordinate flow path pressure drop when the spring is in communication with the remote volume. This requirement further complicates the design of a pneumatic suspension system.

SUMMARY OF THE INVENTION

The present invention provides a turnable pneumatic suspension system. Compact packaging is provided while ensuring that proper air flow to the air spring is maintained. The air charged part of the pneumatic suspension system remains securely sealed during rotation, and during full jounce and rebound travel. Structure is provided to facilitate variable operation under changing vehicle loading and road input conditions.

In particular, the pneumatic suspension system includes an air spring as a compliant element and a damper in combination with the air spring mountable to rotate in concert relative to the vehicle body. The pneumatic suspension system generally includes an air spring assembly that has a canister with a top and an opening through the top. A flexible member, hereinafter referred to a diaphragm, forms a chargeable chamber with the canister. A means of mounting the air spring and a damper rod to the vehicle is provided.

A bolt extends through the opening in the top of the canister and preferably has an axial bore and a radial bore, which together form a charging route through the bolt. A seal ring is captured by the bolt, preferably between the canister top and the bolt. The seal ring preferably has a radial opening communicating with the charging route through the bolt. The air spring is chargeable through the bolt and the seal ring. The air spring, including the canister, the bolt and the damper are rotatable in concert relative to the seal ring which remains substantially stationary relative to the vehicle body. A continuously open charging route is maintained through the seal ring and the bolt to the chargeable chamber of the air spring over a relative large measure of rotation which is effected during vehicle steering.

A dynamic seal is provided between the seal ring and both the canister and the bolt which are rotatable relative to the seal ring. This permits rotation of the suspension module, while the seal ring and therefore, the entrance of the air charging route to the module remain stationary. Maintaining a stationary air fitting helps reduce the necessary packaging space required for the pneumatic suspension module of the present invention, as compared to prior art designs.

According to an embodiment of the present invention, a pneumatic suspension module includes a dual rate mount that provides an independent means of transferring input forces from the damper's rod to the vehicle strut tower as opposed to those forces transferred by the air spring to the strut tower. Providing a mount designed to transmit forces from both the damper and the air spring to the vehicle's body through separating paths improves tuning of the mounting system when matching the suspension module to a particular application.

The air spring's diaphragm engages the canister and the damper to provide a pressurized air chamber. Means are preferably provided for varying the gas charge within the chargeable chamber to vary the spring rate of the air spring by providing means of selective communication with a remote device that is capable of volumetric compensation. In this regard, the invention includes a means of maintaining a sufficiently large communication route between the air spring and the remote device so that an acceptable range of spring rates are possible. Providing a sufficiently large charging route ensures that the selected spring rate is achieved in actuality. Through communication between the air spring and the remote device in response to vehicle operational conditions, enhanced load carrying and handling characteristics are provided.

A preferable feature of an embodiment of the present invention is a combination nut and preload washer. This dual functioning device is positioned inside the canister of the air spring and operates to engage the bolt capturing the bolt within the opening at the top of the canister, so that the seal ring is securely, yet rotatably held in position. In addition, the thickness of the nut is specifically selected to impart a predetermined amount of preload into the damper mounting structure. This is accomplished by compressing an elastomeric element of the damper mount between a rigid support and the nut.

Another preferable feature of an embodiment of the present invention includes a seal ring that serves the additional function of operating as a rebound stop. The seal ring carries a resilient element that operates to provide a lower limit of movement of the suspension module relative to the mounting structure of the vehicle. This occurs by engagement between the seal ring assembly and the strut tower during rebound operation of the damper, limiting downward travel relative of the vehicle. Rebound stop functioning is achieved without interfering with the secure seal that is provided by the seal ring for the charging route of the air spring.

DETAILED DESCRIPTION OF THE PRESENTLY PREFERRED EMBODIMENT

Figure 1:
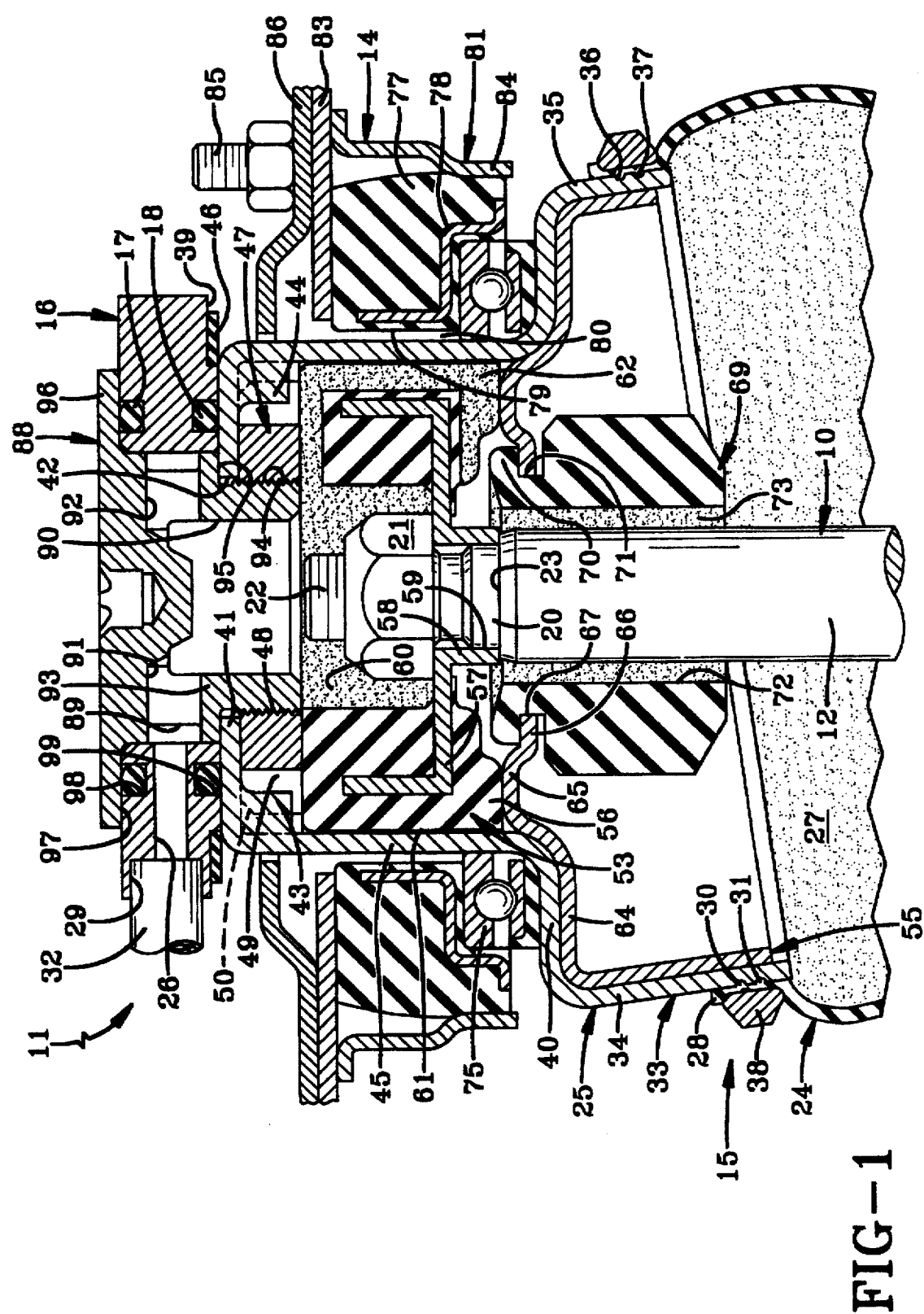
FIG. 1 is a fragmentary cross sectional illustration of a pneumatic suspension system.

Referring to the drawings, illustrated in FIG. 1 is the upper mounting area of a pneumatic suspension system 11 in accordance with the present invention. In general, canister 25 and diaphragm 24 provide a chargeable air chamber 27 operating as an air spring designated in the aggregate as 15. The canister 25 is a rigid element formed of metal or durable plastic and in the present embodiment is made of steel.

The diaphragm 24 is fabricated of a reinforced natural or synthetic rubber construction. In the present embodiment the diaphragm 24 is provided in a rolling lobe type arrangement, although the present invention is not limited to this specific type of air spring construction. The diaphragm 24 includes an upper end 28 on which is formed a pair of annular ribs 30 and 31. The lower end of the diaphragm 24 (not illustrated) is conventionally connected to the reservoir tube (not illustrated) of the damper 10. Canister 25 includes an annular lower leg 33 that has an inboard side 34 extending a length greater than the length of the outboard side 35. In operation this elliptical construction provides a means of compensating for transverse loading on the pneumatic suspension module 11. The annular leg 33 of canister 25 includes a pair of annular grooves 36 and 37. The annular ribs 30 and 31 of diaphragm 24 are received within the annular grooves 36 and 37 and are held therein by a crimp ring 38 which maintains upper end 28 of diaphragm 24 in gas-tight engagement with canister 25.

Canister 25 also includes annular shoulder 40 which is disposed in a generally horizontal orientation and cylindrical portion 45 which is disposed in a generally vertical orientation. The canister 25 includes a top portion 41 that has an opening 42 formed therein. A pair of braces 43 and 44 are formed at the juncture between the top portion 41 and the cylindrical portion 45.

Figure 2:
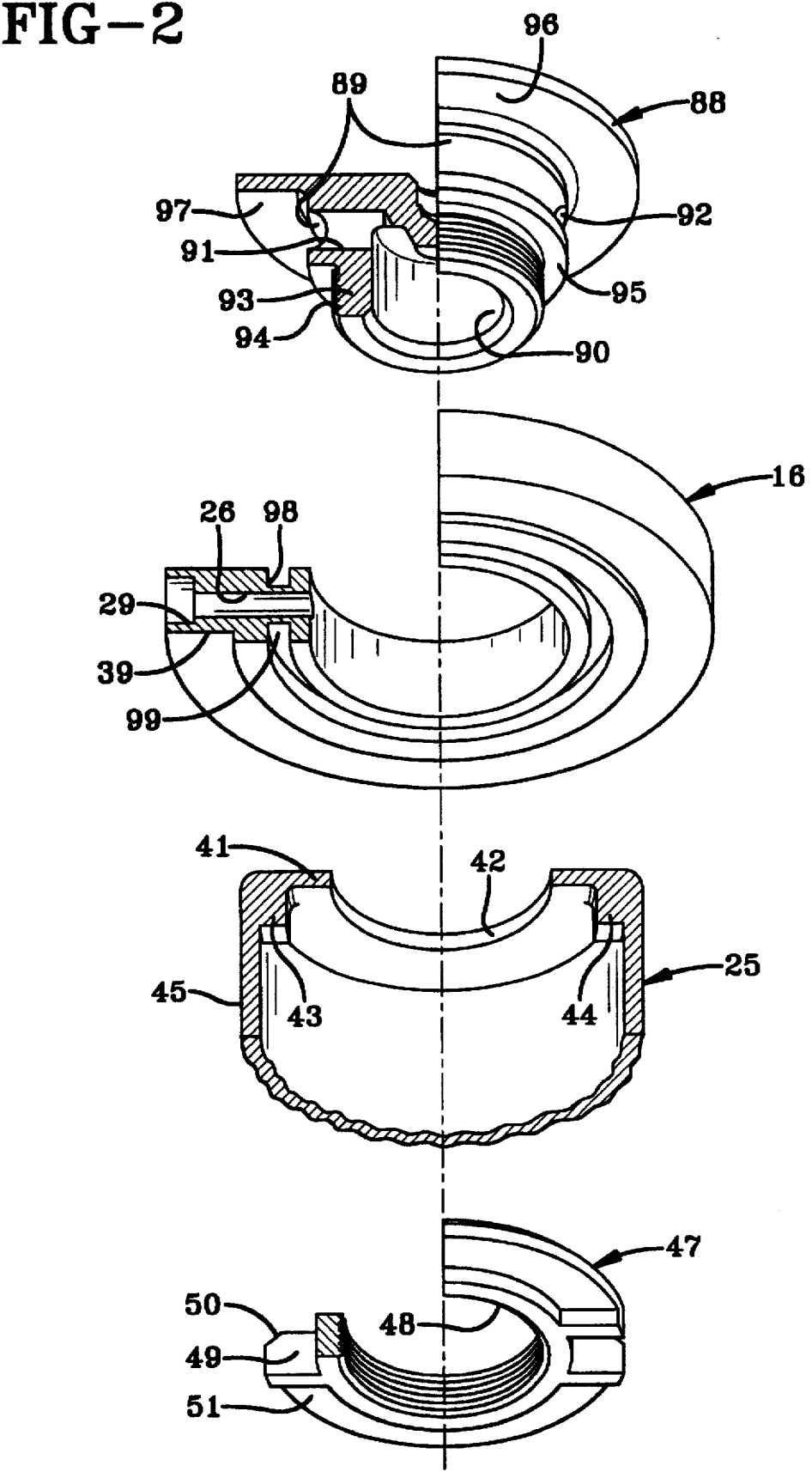
FIG. 2 is a partially exploded perspective illustration of the pneumatic suspension system of FIG. 1 detailing the bolt, the seal ring, the upper portion of the canister and the nut.

Additional reference is directed to FIG. 2 along with FIG. 1 to aid in the following description. A nut 47 is positioned within the canister 25 against the top portion 41 and presents a threaded opening 48 that is substantially coaxial with the opening 42 of canister 25. Nut 47 includes a pair of notches, representative of which is notch 49. The notch 49 receives the brace 43 of canister 25 when the nut 47 is positioned against the top portion 41 so as to prevent relative rotation between the nut 47 and canister 25. The nut 47 also includes a beveled upper perimeter 50 to ensure that the nut 47 closely mates with the inside of upper portion 41 of canister 25. Additionally, a recessed area 51 is provided around a substantial portion of the underside of nut 47 to match the upper contour of the adjacent damper mount 53.

Damper mount 53 is captured within cylindrical portion 45 of canister 25 and is compressed between support 55 and nut 47. The damper mount 53 includes an elastomeric element 56 which is bonded to a rigid metal support 57. The elastomeric element 56 includes an open central area 60 and is generally rib-like around its outer periphery 61 so that a plurality of grooves are formed. Representative of which is groove 62 which forms a charging passage around the damper mount 53.

Compressing elastomeric element 56 between the nut 47 and the rigid support 57 imparts a preload into the mount 53. The preload is selected according to the specific application in which the pneumatic suspension system 11 is intended to operate. The preload restricts mount travel until a certain level of input force is exceeded.

The support 57 includes an annular leg 58 which forms an opening 59 that is substantially coaxial with the opening 42 of canister 25. Support 55 also includes a main body 64 that is shaped to generally follow the contour of annular shoulder 40 and annular lower leg 33 of canister 25. An annular ledge 65 is defined radially inside the main body 64 which supports the damper mount 53 biasing it against nut 47. An extension 66 of support 55 forms an opening 67 that is substantially coaxial with the opening 42 of canister 25.

An annular resilient jounce bumper 69 includes an upper annular leg 70 that helps to define an annular groove 71. The jounce bumper 69 is maintained in position by extension 66 of support 55, the extension 66 being securely received within annular groove 71 when the jounce bumper 69 is positioned within opening 67. The jounce bumper 69 includes a central opening 72 that extends completely therethrough. Opening 72 has a diameter larger than the diameter of rod 12 so that an annular passage 73 provides a continuously open air route from one side of the jounce bumper 69 to the other.

The compression stroke of the damper 10 is controlled by the jounce bumper 69, in-that, as the wheel assembly (not illustrated) of the associated vehicle encounters road inputs the damper 10 undergoes compression and extension strokes. The compression stroke is limited by engagement of the jounce bumper 69 with a suitable contacting surface provided at the top of the damper's tube (not illustrated).

The pneumatic suspension module 11 is provided as a turnable unit through means of bearing assembly 75 which is carried between annular shoulder 40 of canister 25 and mount assembly 14. The bearing assembly 75 is of a substantially conventional construction and is adapted to engage the shoulder 40 and mount assembly 14.

The mount assembly 14 includes a resilient annular element referred to as cushion 77 with integral rigid metal support 78. The cushion 77 includes a central opening 79 that is received over the cylindrical portion 45 of canister 25 with a continuously open space 80 providing a gap therebetween.

The cushion 77 is carried in a mount housing 81 which includes a substantially flat upper plate 83 and a convoluted substantially annular side plate 84. The mount housing 81 carries a plurality of fasteners, representative of which is fastener 85, which are provided for attachment of the mount assembly 14 to the associated vehicle's strut tower 86. The strut tower 86 is substantially immovable relative to the remainder of the vehicle structure and therefore, the mount assembly 14, which is fastened thereto, is also substantially immovable.

The canister 25 however, is rotatable relative to the mount assembly 14 and is turnable in concert with the remainder of air spring 15 and the damper 10. Support is provided between the turnable components and mount assembly 14 by the bearing assembly 75.

The damper 10 is engaged with the canister 25 and is therefore, turnable in concert therewith, by means of the interposed damper mount 53. The elastomeric element 56 of damper mount 53 is compressed between the rigid support 55 and the nut 47 which biases the outer periphery 61 against the cylindrical portion 45 of canister 25. The rod 12 is connected to damper mount 53 by means of neck 20 which is received within opening 59 of the rigid metal support 57. Neck 20 is fixed in position relative to the rigid metal support 57 by means of nut 21 which is received on threaded section 22 of rod 12, thereby capturing annular leg 58 between nut 21 and shoulder 23 of damper rod 12.

As a means of closing the opening 42 of canister 25 and therefore, confining the gas charge within the air spring 15 a bolt 88 extends through opening 42 and is fixed therein by means of threaded engagement with nut 47. The bolt 88 includes an axial bore 90 that extends only partially therethrough and which opens to the opened central area 60 of damper mount 53. An annular groove 89 is formed around the bolt 88 and radial bores 91 and 92 extend between the annular groove 89 and the axial bore 90. This provides a charging route between the annular groove 89 of the bolt 88 and the central opening 60 of the damper mount 53.

The bolt 88 includes annular leg 93 which threadedly engages the nut 47 and maintains the bolt 88 in position. The outer diameter 94 of the annular leg 93 is slightly smaller than the opening 42 of the canister 25 which facilitates attachment of the bolt 88 to the nut 47. The bolt 88 also includes an annular shoulder 95 which engages the top portion 41 of canister 25 around the opening 42 and limits the distance that the bolt 88 is allowed to penetrate to the canister 25.

The bolt 88 has an annular wall 96 that, in combination with the top 41 of canister 25, assists in defining an annular groove shaped opening 97 radially outside of the annular groove 89. The annular opening 97 receives seal ring assembly 16 which is captured between annular wall 96 of bolt 88 and top 41 of canister 25. The annular shoulder 95 ensures that the seal ring assembly 16 remains rotatable when it is so captured in the annular opening 97. Annular seals 17 and 18 are provided in grooves 98 and 99 of seal ring 16, to prevent the escape of the gas charge of air spring 15 around the seal ring assembly 16.

An air passage 26 extends radially through the seal ring assembly 16 and includes an increased diameter section 29 for connection to an air line 32 for communication with a remote pressurization source (not illustrated). The air line 32 is preferably made of stainless steel tubing and is fixed in the section 29 by brazing. Therefore, the air line 32 which is connected to the seal ring assembly 16 is rigid in construction.

Relative rotation is provided between the seal ring assembly 16 and both the bolt 88 and canister 25 since the air spring 15 and damper 10 assembly are rotatable while the seal ring assembly 16 remains in its radial position. A typical amount of relative rotation that is provided is up to approximately plus or minus 30 to 35 degrees during typically encountered steering maneuvers of the associated vehicle.

Rotation is assisted by means of the construction of seals 17 and 18 which are made of a conventionally known low friction material such as an internally lubricated nitrile compound. The seals 17 and 18 remain stationary with the seal ring assembly 16 by means of providing a rougher surface finish within the grooves 98 and 99 as compared to the surface finish of the annular wall 96 of bolt 88 and the top portion 41 of canister 25. This is beneficial because relative movement at the sealing surfaces occurs only at the interface with the bolt 88 and the top portion 41, rather than at the six sealing interfaces with the seal ring in the grooves 98 and 99.

The seal ring assembly 16 serves the additional function of providing a rebound stop for the pneumatic suspension module 11. The seal ring assembly 16 includes an annular groove 39 formed in its bottom surface which carries an annular bumper 46 that is made of an elastomeric material such as natural or synthetic rubber. During rebound action of the pneumatic suspension system 11 the cushion 77 resiliently expands and therefore, the canister 25 moves downward relative to the fixed upper plate 83 of mount assembly 14. Downward travel of the canister 25 is limited by the seal ring assembly 16 when annular bumper 46 engages strut tower 86. The rebound stop function of the seal ring assembly 16 is provided while the integrity of the seals 17 and 18 is maintained. This is in part facilitated by the unique construction of the bolt 88.

The present invention through means of the foregoing structure provides a dynamic seal that allows the damper 10 and air spring 15 to rotate as required for operation in the associated vehicle, while the air flow passage to and from the air spring 15 is maintained in sealed fashion. The point of connection to the remote pressurization source at the seal ring assembly 16 remains stationary. This reduces the packaging space that is required by the pneumatic suspension system 11 as compared to conventional designs.

What is claimed is:

1. A pneumatic suspension system mountable to a vehicle's structure comprising:
   an air spring assembly including an air canister having a top with an opening through the top;
   a diaphragm forming a chamber with the canister;
   a bolt extending through the opening in the top of the canister having an axial bore and a radial bore intersecting the axial bore;
   a seal ring captured between the canister top and the bolt having a radial opening communicating with the radial bore of the bolt wherein the air spring, bolt and mount are rotatable in concert relative to the seal ring and wherein a continuously open charging route is maintained through the seal ring and bolt to the chamber.

2. A pneumatic suspension system according to claim 1 further comprising a mount carried in the canister and a damper having a rod attached to the mount.

3. A pneumatic suspension system according to claim 2 further comprising a nut that engages the bolt and maintains the bolt in position relative to the canister wherein the nut imparts a preload to the mount.

4. A pneumatic suspension system according to claim 3 further comprising a rigid support fixed in the canister wherein the mount is captured between the rigid support and the top of the canister.

5. A pneumatic suspension system according to claim 4 wherein the nut is positioned between the top of the canister and the mount wherein the nut imparts a preload in the mount by compressing the mount against the rigid support restricting mount travel below a predetermined input force level.

6. A pneumatic suspension system according to claim 1 wherein the seal ring operates to limit rebound travel of the pneumatic suspension system by contacting the vehicle's structure at a rebound travel limit.

7. A pneumatic suspension system according to claim 1 wherein the canister includes a cylindrical section extending downwardly from the top and an annular shoulder extending radially outwardly from the cylindrical section and further comprising a mount connectable to the vehicle's structure surrounding the cylindrical portion with a gap between the mount and the cylindrical portion and further comprising a bearing rotatably engaged between the annular shoulder and the mount so that the air spring is rotatable relative to the mount.

8. A pneumatic suspension system according to claim 7 wherein the seal ring includes a first annular groove adjacent the bolt and a second annular groove adjacent the top and further comprising a first seal positioned in the first annular groove sealingly engaging the bolt and the seal ring and further comprising a second seal positioned in the second annular groove sealingly engaging the seal ring and the top.

9. A pneumatic suspension system according to claim 8 wherein the first and second annular grooves have a rough surface as compared to bolt and the top so that the first and second seals remain substantially stationary in the first and second annular grooves when the bolt and the top rotate relative to the seal ring.

10. A pneumatic suspension system comprising:

a rotatable air spring assembly including a canister having a top with an opening through the top and the air spring including a diaphragm forming a chamber with the canister the chamber being chargeable with a gas charge;

a bolt extending through the opening in the top of the canister;

a nut capturing the bolt in position relative to the canister so that both the bolt and the nut are rotatable in concert with the air spring about a common axis;

a seal ring captured between the bolt and the canister the seal ring remaining stationary in a rotational sense relative to the rotatable air spring wherein the seal ring includes an air passage through which the gas charge is effected in the air spring.

11. A pneumatic suspension system according to claim 10 further comprising a damper mount carried in the canister and a damper rod attached to the damper mount wherein the damper mount and the damper rod are rotatable in concert with the air spring.

12. A pneumatic suspension system according to claim 11 further comprising a fixed mount assembly and a bearing positioned between the fixed mount assembly and the canister wherein the canister includes a cylindrical section extending downwardly from the top and wherein the fixed mount assembly includes a resilient cushion the resilient cushion having an opening wherein the cylindrical section is received within the opening and the cushion is spaced away from the cylindrical section.

13. A pneumatic suspension system according to claim 12 wherein the air spring is rotatable over a distance of at least sixty degrees relative to the seal ring.

14. A pneumatic suspension system mountable to a vehicle's structure comprising:

an air spring assembly including an air canister having a top with an opening through the top;

a diaphragm forming a chamber with the canister;

a bolt extending through the opening in the top of the canister having an axial bore and a radial bore intersecting the axial bore;

a seal ring captured between the canister top and the bolt having a radial opening communicating with the radial bore of the bolt wherein the air spring, bolt and mount are rotatable in concert relative to the seal ring and wherein a continuously open charging route is maintained through the seal ring and bolt to the chamber wherein the seal ring includes a bottom surface with a groove in the bottom surface; and a bumper carried in the groove.

15. A pneumatic suspension system according to claim 14 wherein the canister is movable in a rebound direction relative to the vehicle's structure and wherein the bumper is engageable with the vehicle's structure limiting movement of the canister in the rebound direction.

* * * * *